(12) United States Patent
Nodomi

(10) Patent No.: US 11,951,426 B2
(45) Date of Patent: *Apr. 9, 2024

(54) FILTER DEVICE

(71) Applicant: YAMASHIN-FILTER CORP., Kanagawa (JP)

(72) Inventor: Youichi Nodomi, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 424 days.

This patent is subject to a terminal disclaimer.

(21) Appl. No.: 17/329,461

(22) Filed: May 25, 2021

(65) Prior Publication Data

US 2021/0275945 A1    Sep. 9, 2021

Related U.S. Application Data

(63) Continuation of application No. PCT/JP2019/046954, filed on Dec. 2, 2019.

(30) Foreign Application Priority Data

Dec. 4, 2018 (JP) .................................. 2018-227420

(51) Int. Cl.
  *B01D 35/18* (2006.01)
  *B01D 29/21* (2006.01)
  (Continued)

(52) U.S. Cl.
  CPC ............. *B01D 35/18* (2013.01); *B01D 29/21* (2013.01); *B01D 29/902* (2013.01);
  (Continued)

(58) Field of Classification Search
  CPC ...... B01D 35/18; B01D 29/21; B01D 29/902; B01D 35/30; B01D 53/9418; F02M 37/30
  (Continued)

(56) References Cited

U.S. PATENT DOCUMENTS

| 2007/0246027 A1 | 10/2007 | Kobayashi |
| 2012/0312733 A1 | 12/2012 | Elayed et al. |

(Continued)

FOREIGN PATENT DOCUMENTS

| EP | 1849990 A2 | 10/2007 |
| JP | 2013-510712 A | 3/2013 |

(Continued)

OTHER PUBLICATIONS

Office Action issued in Japanese Patent Application No. 2018-227420 dated Dec. 27, 2022, with English Translation (6 pages).

(Continued)

*Primary Examiner* — Claire A Norris
(74) *Attorney, Agent, or Firm* — Nakanishi IP Associates, LLC

(57) ABSTRACT

A filter case that internally includes a filter element including a filtration member having a substantially cylindrical shape that filters the liquid and an inner tube having a substantially cylindrical shape provided inside the filtration member. The inner tube includes a partition plate that covers a hollow portion of a side surface. A heater provided on a bottom surface of the filter case includes a substantially rod-shaped heating unit. The heating unit is inserted into a space surrounded by the side surface and the partition plate of the inner tube via a first hole formed at a position overlapping with the hollow portion of the inner tube in the first plate that covers a lower end of the filtration member.

6 Claims, 5 Drawing Sheets

(51) Int. Cl.
  *B01D 29/90* (2006.01)
  *B01D 29/92* (2006.01)
  *B01D 35/30* (2006.01)
  *B01D 53/94* (2006.01)

(52) U.S. Cl.
  CPC .......... *B01D 29/925* (2013.01); *B01D 35/30* (2013.01); *B01D 53/9418* (2013.01)

(58) Field of Classification Search
  USPC ............................................. 210/497.01, 184
  See application file for complete search history.

(56) References Cited

U.S. PATENT DOCUMENTS

| | | |
|---|---|---|
| 2013/0199979 A1 | 8/2013 | Jauss et al. |
| 2014/0352284 A1 | 12/2014 | Maguin |
| 2015/0008172 A1* | 1/2015 | Kocksch ................ B01D 29/15 210/184 |
| 2016/0346715 A1 | 12/2016 | Koonce et al. |

FOREIGN PATENT DOCUMENTS

| | | |
|---|---|---|
| JP | 2015-508706 A | 3/2015 |
| WO | 2005/049173 A1 | 6/2005 |
| WO | 2011/060254 A1 | 5/2011 |
| WO | 2013/121004 A1 | 8/2013 |

OTHER PUBLICATIONS

International Search Report issued in PCT/JP2019/046954 dated Feb. 18, 2020 with English Translation (5 pages).
Extended European Search Report issued in European Patent Application No. 19893824.3, dated Jan. 12, 2022 (8 pages).

* cited by examiner

FILTER DEVICE

CROSS-REFERENCE TO RELATED APPLICATIONS

This application is a continuation application of International Patent Application No. PCT/JP2019/046954 filed on Dec. 2, 2019, which claims priority to Japanese Patent Application No. 2018-227420 filed on Dec. 4, 2018, the entire contents of which are incorporated by reference.

TECHNICAL FIELD

The present invention relates to a filter device.

BACKGROUND ART

Patent Document 1 discloses a liquid filter structure in which a shrinkable element including a package having gas enclosure volume is disposed in a filter housing, and the shrinkable element shrinks in response to pressure generated by the freezing of liquid in a filtration housing.

CITATION LIST

Patent Literature

Patent Document 1: Japanese Translation of PCT International Application Publication No. 2013-510712

Urea water is generally used to remove a nitrogen oxide incorporated in exhaust gas discharged from an engine. However, urea water is liable to freeze at a low temperature, and when the urea water freezes and expands inside a filter device, a filter case and a filter element may break.

The invention described in Patent Document 1 is made to prevent the breakage of the filter element and the filter housing by the shrinkage of the shrinkable element. However, the invention described in Patent Document 1 cannot prevent the freezing of liquid.

SUMMARY OF INVENTION

One or more embodiment of the present invention is to provide a filter device and a filtration device capable of preventing the freezing of liquid and also preventing the breakage of the device even when the liquid freezes.

A filter device according to one or more embodiment of the present invention as, for example, a filtration device for filtering a freezable liquid includes a filter case, a filter element, and a heater. The filter case includes an inflow portion and an outflow portion for the liquid. The filter element has a (substantially) cylindrical shape provided inside the filter case with a center axis extending in a vertical direction. The filter element includes a filtration member, an inner tube, a first plate, and a second plate. The filtration member has a (substantially) cylindrical shape that filters the liquid. The inner tube having a (substantially) cylindrical shape is provided inside the filtration member. The first plate covers a lower end of the filtration member. The second plate covers an upper end of the filtration member. The heater is provided on a bottom surface of the filter case. The inner tube includes a partition plate that covers a hollow portion of an inner tube side surface as a side surface having a (substantially) tubular shape of the inner tube. The inner tube side surface has a first region and a second region. The first region is located vertically upward of the partition plate. The second region is located vertically downward of the first region. In the first region, a plurality of holes penetrating the inner tube side surface are formed. The first plate has a first hole at a position overlapping with the hollow portion of the inner tube, such that the first hole communicates with the hollow portion. The heater includes a (substantially) rod-shaped heating unit. The heating unit is inserted into a space surrounded by the second region in the inner tube side surface and the partition plate via the first hole.

According to the filter device according to one or more embodiment of the present invention, the filter case internally includes the filter element including the filtration member having the (substantially) cylindrical shape that filters the liquid and the inner tube having the (substantially) cylindrical shape provided inside the filtration member. The inner tube includes the partition plate that covers the hollow portion of the side surface. The heater provided on the bottom surface of the filter case includes the (substantially) rod-shaped heating unit. The heating unit is inserted into the space surrounded by the side surface and the partition plate of the inner tube via the first hole formed at the position overlapping with the hollow portion of the inner tube in the first plate that covers the lower end of the filtration member, such that the first hole communicates with the hollow portion. Thus, the heating unit warms the liquid, ensuring preventing freezing of the liquid. In addition, when the liquid flows into the inside of the filter case, air remains in the space surrounded by the side surface and the partition plate of the inner tube. Accordingly, even when the liquid is frozen and the liquid expands, breakage of the device can be prevented. Furthermore, by inserting the heating unit into the space surrounded by the side surface and the partition plate of the inner tube, the filter device can be downsized and a volume of the space that stores the liquid inside the filter case can be reduced. Thus, a volume (quantity of water) of the liquid stored in the filter case can be reduced, and a volume change during freezing can be reduced.

Here, the second plate may have a second hole having a (substantially) cylindrical shape at a position overlapping with the hollow portion of the inner tube, such that the second hole communicates with the hollow portion. The outflow portion may communicate with the second hole. The second hole may include a (substantially) frusto-conical shaped portion having an inner diameter on an upper side smaller than an inner diameter on a lower side. This allows eliminating the space serving as an air pocket inside the second hole and preventing a defect due to air that is supplied to a pump or an injector when an inclination of the filter device is eliminated.

Here, a ring having a (substantially) cylindrical shape may be disposed between the filter element and the filter case. The ring may be movable between the first plate and the second plate. This allows reducing the space serving as the air pocket formed at a corner of the filter element and preventing the defect due to air that is supplied to the pump or the injector when the inclination of the filter device is eliminated.

Here, the second plate may be larger than the filtration member. The filter case may have a side surface having a (substantially) cylindrical shape. A diameter of an inner peripheral surface of the side surface may be (substantially) equal or identical to a diameter of an outer peripheral surface of the second plate. A difference between a diameter of the second plate and a diameter of the filtration member may be (substantially) equal or identical to a thickness of the ring. This allows reducing the volume of the space storing urea water inside the filter case, reducing the volume (the quantity of water) of the urea water stored in the filter case, and reducing the volume change during freezing. Moreover, reducing the volume of the space storing the urea water inside the filter case allows reducing the air supplied to the injector at a time of start of a construction machine, thus ensuring preventing a defect caused by air.

According to one or more embodiment of the present invention, the freezing of liquid can be prevented and the breakage of a device can also be prevented even when the liquid freezes.

DESCRIPTION OF EMBODIMENTS

Hereinafter, embodiments of the present invention will be described in detail with reference to the drawings. The present invention is applicable to a selective catalytic reduction (SCR) type urea SCR system that reduces NOx (nitrogen oxide) contained in exhaust air of an internal combustion engine (particularly a diesel engine). Note that a liquid used in the SCR type system is not limited to urea water, and various liquids that can reduce NOx can be used.

Figure 5:
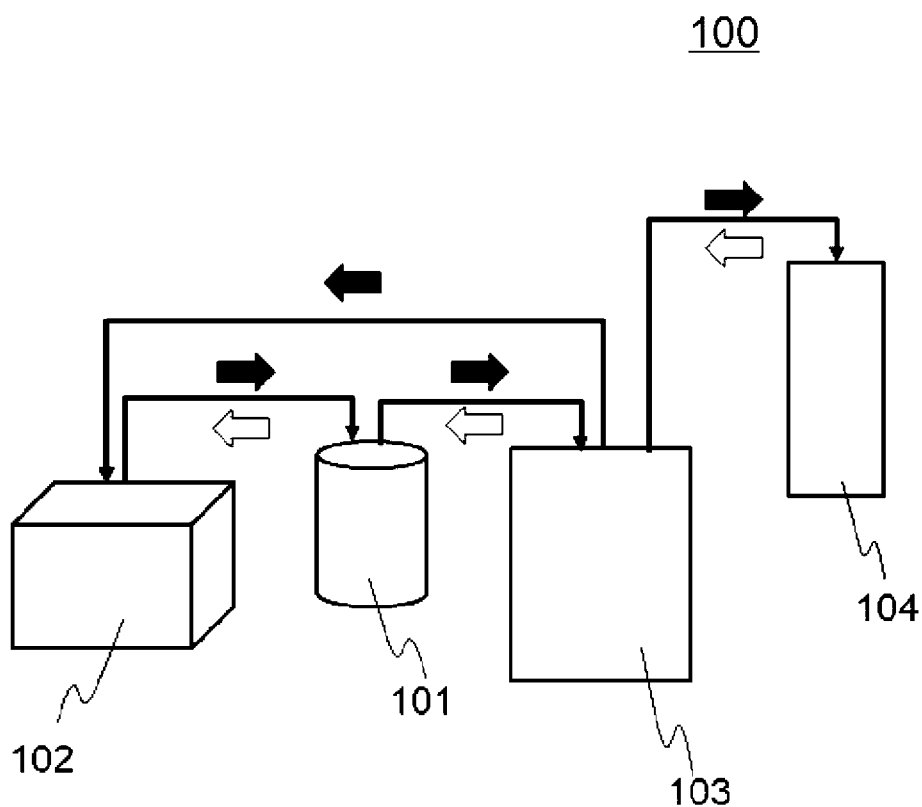
FIG. 5 is a view illustrating an overview of a general urea SCR system 100.

FIG. 5 is a view illustrating an overview of a general urea SCR system 100. The urea SCR system 100 mainly includes a filter device 101, a tank 102, a pump 103, and an injector 104. When an engine of, for example, a construction machine to which the urea SCR system 100 is mounted or an automobile is started, the urea water stored in the tank 102 is sucked up by the pump 103. Thus, the urea water passes through the tank 102, the filter device 101, and the pump 103 to be supplied to the injector 104, and is sprayed from the injector 104 (see black arrows in FIG. 5). Some of the urea water is returned from the pump 103 to the tank 102 (see the black arrow in FIG. 5). When the engine of the construction machine or the like is stopped, the urea water inside the filter device 101, the pump 103, and the injector 104 is returned to the tank 102 to prevent the freezing of the urea water (see hollow arrows in FIG. 9).

Hereinafter, the present invention will be described in a case where urea water is used as a fluid, taking a filter device used in the urea SCR system 100 as an example, but the present invention is applicable to a filtration device that filters various kinds of fluids that can be frozen.

Figure 1:
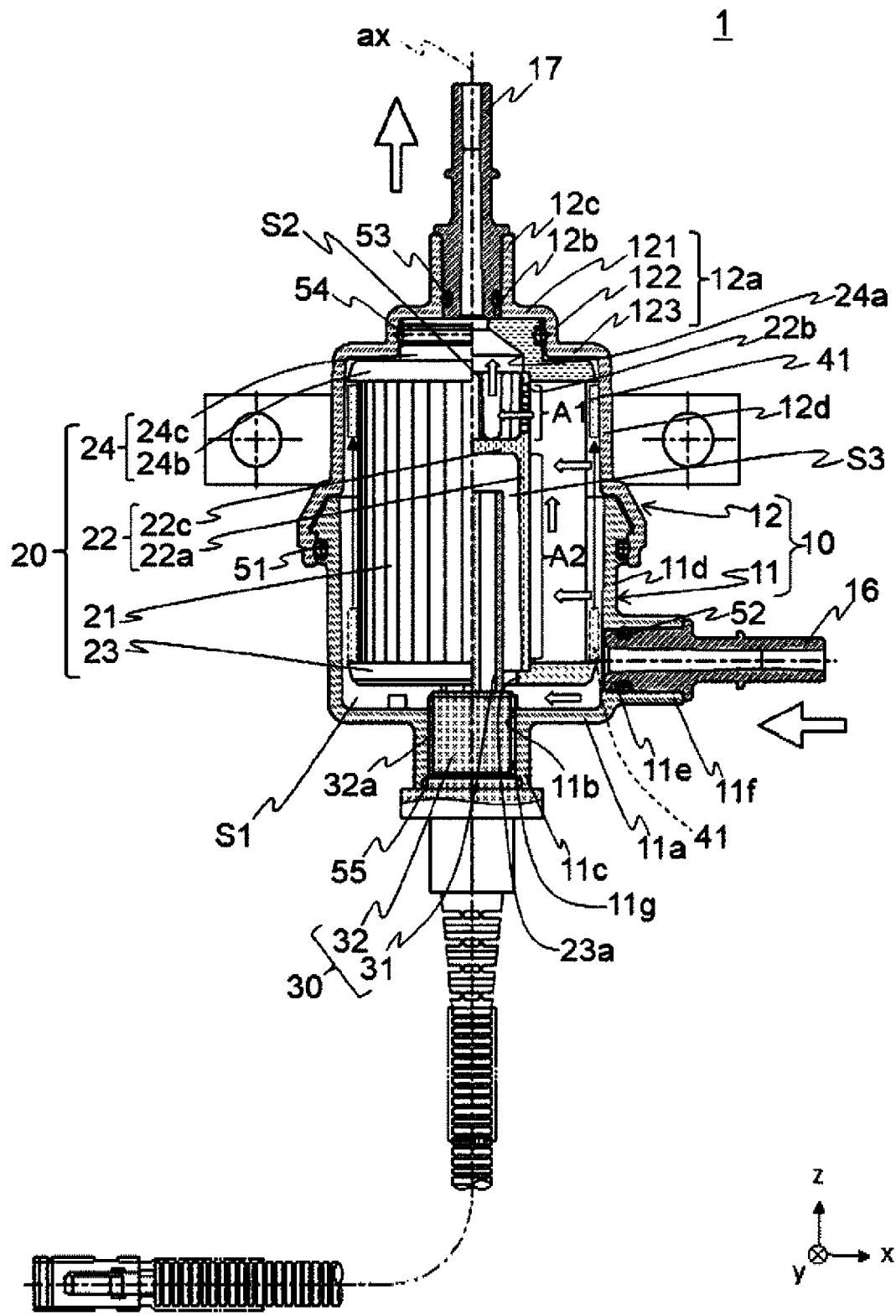
FIG. 1 is a vertical cross-sectional view illustrating an overview of a filter device 1 according to an embodiment of the present invention.
Figure 2:
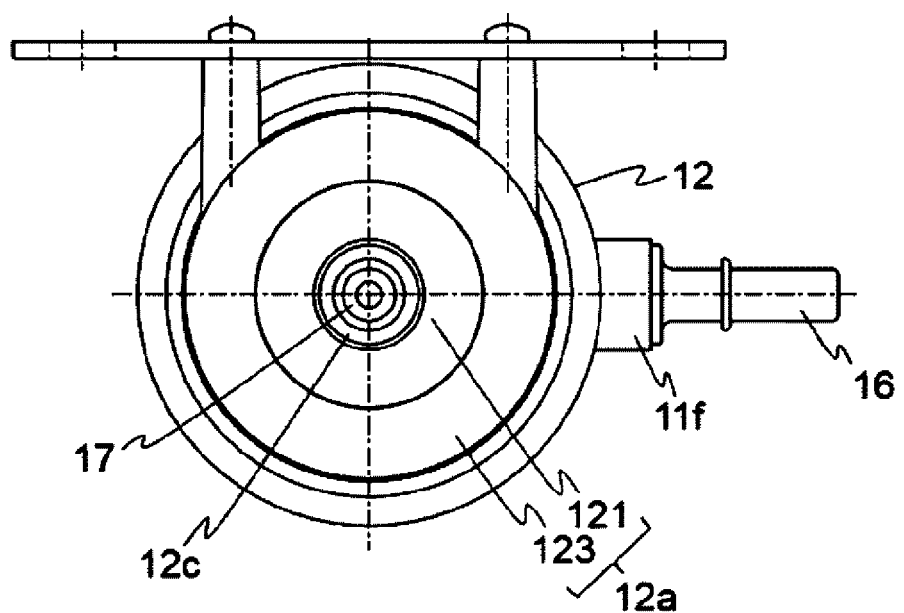
FIG. 2 is a plan view illustrating the overview of the filter device 1.
Figure 3:
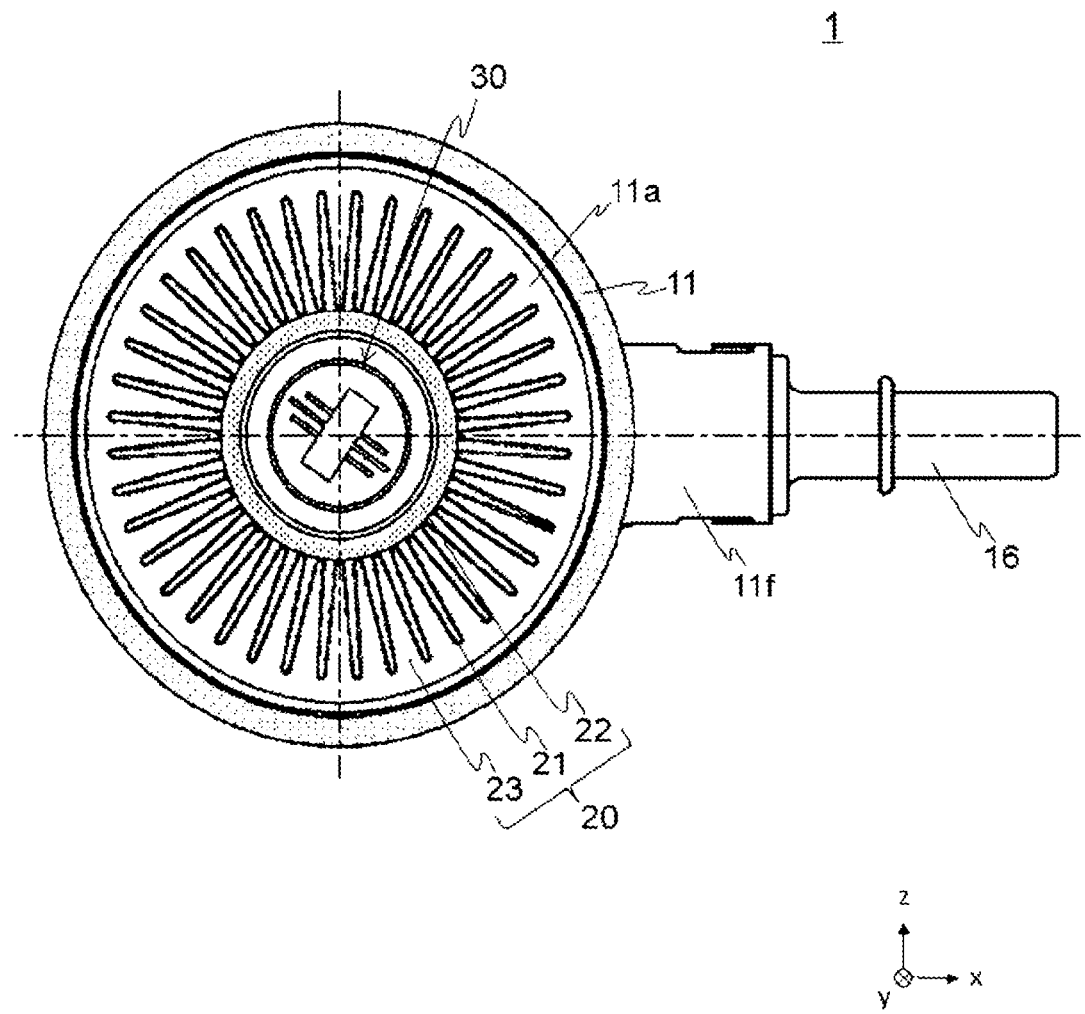
FIG. 3 is a transverse cross-sectional view illustrating the overview of the filter device 1.

FIG. 1 is a vertical cross-sectional view illustrating an overview of the filter device 1 according to an embodiment of the present invention. FIG. 2 is a plan view illustrating the overview of the filter device 1. FIG. 3 is a transverse cross-sectional view illustrating the overview of the filter device 1. In FIG. 1, a left side from a center line ax is a cross-sectional view in which a portion of a filter case 10 and a portion of a heater 30 are cut, and a right side from the center line ax is a cross-sectional view in which the filter case 10, a filter element 20, and the heater 30 are cut. Note that in FIGS. 1 and 3, hatching representing a cross-sectional surface is omitted as for some components.

The filter device 1 mainly includes the filter case 10, the filter element 20, the heater 30, and a ring 41.

The filter case 10 mainly includes a lower case 11 and an upper case 12. The filter case 10 mainly internally includes the filter element 20, the heater 30, and the ring 41.

The lower case 11 is a substantially cylindrical member with a bottom and includes a hollow inside. An upper end surface of the lower case 11 is open. A heater mounting hole 11b into which the heater 30 is inserted is formed in a bottom surface 11a of the lower case 11. Furthermore, the bottom surface 11a has a tubular portion 11c having a substantially cylindrical shape, and a hollow portion of the tubular portion 11c overlaps with the heater mounting hole 11b.

An inflow hole 11e through which the urea water flows into the filter device 1 is formed in a side surface 11d of the lower case 11. Additionally, the side surface 11d includes a substantially cylindrical inflow portion 11f, and a hollow portion of the inflow portion 11f overlaps with the inflow hole 11e. An inflow pipe 16 is inserted into the inflow portion 11f. A sealing member (for example, an O-ring) 52 is provided between the inflow portion 11f and the inflow pipe 16, and the sealing member 52 avoids the urea water to leak from between the inflow portion 11f and the inflow pipe 16. The inflow hole 11e, the inflow portion 11f, and the inflow pipe 16 are equivalent to an inflow portion.

The upper case 12 is a member that covers an open end of the upper portion of the lower case 11. The upper case 12 is provided to be attachable/detachable with respect to the lower case 11. A sealing member (for example, an O-ring) 51 is provided between the lower case 11 and the upper case 12, and the sealing member 51 avoids the urea water to leak from between the lower case 11 and the upper case 12.

An outflow hole 12b through which the urea water flows out of the filter device 1 is formed in an upper end surface 12a of the upper case 12. The upper end surface 12a includes a substantially cylindrical outflow portion 12c, and a hollow portion of the outflow portion 12c overlaps with the outflow hole 12b. An outflow pipe 17 is inserted into the outflow portion 12c. A sealing member (for example, an O-ring) 53 is provided between the outflow portion 12c and the outflow pipe 17, and the sealing member 53 avoids the urea water to leak from between the outflow portion 12c and the outflow pipe 17. The outflow hole 12b, the outflow portion 12c, and the outflow pipe 17 are equivalent to an outflow portion.

The side surface 11d of the lower case 11 and a side surface 12d of the upper case 12 have substantially the same inner diameter. Accordingly, by thus assembling the lower case 11 and the upper case 12, the filter case 10 has a substantially cylindrical shape with both ends covered.

The filter element 20 is a member having a substantially tubular shape (here, a substantially cylindrical shape) with both ends covered, and provided inside the filter case 10. The center line ax of the filter case 10 and the filter element 20 extend in a vertical direction (a z-direction).

The filter element 20 mainly includes a filtration member 21, an inner tube 22, and plates 23, 24.

The filtration member 21 is configured to filter the urea water, and has a substantially cylindrical shape having the thickness in a radial direction. The filtration member 21 is formed by pleating a filter paper formed with a synthetic resin, paper, or the like, and connecting both ends of the pleated filter paper to roll into a cylindrical shape.

The inner tube 22 is a member having a substantially cylindrical shape made of a resin, and is provided inside the filtration member 21. The height of the inner tube 22 and the height of the filtration member 21 are substantially the same.

A side surface 22a being substantially cylindrical of the inner tube 22 includes a first region A1 located above in the vertical direction and a second region A2 located below the first region A1 in the vertical direction. The first region A1 includes an upper end of the inner tube 22, and the second region A2 includes a lower end of the inner tube 22. In the first region A1 of the side surface 22a, a hole 22b through which urea water passes is formed substantially in the entire surface, but in the second region A2 of the side surface 22a, no hole 22b is formed.

Note that in the present embodiment, the first region A1 is substantially ⅓ of the overall height of the inner tube 22, but the height of the second region A2 is not limited to this. However, it is desirable that the height of the first region A1 is substantially not larger than half of the height of the inner tube 22.

The inner tube 22 includes a partition plate 22c that covers a hollow portion of the side surface 22a. The diameter of the partition plate 22c is substantially the same as the inner diameter of the side surface 22a. A position in a height direction (z-direction) of the partition plate 22c is between the first region A1 and the second region A2. In other words, the first region A1 is a region positioned on the upper side of the partition plate 22c, and the second region A2 is a region positioned on the lower side of the partition plate 22c.

The plate 23 is a substantially circular plate-shaped member and covers lower ends of the filtration member 21 and the inner tube 22. The plate 24 is a substantially circular plate-shaped or a substantially cylindrical member and covers upper ends of the filtration member 21 and the inner tube 22. The plate 24 is provided on the upper end surface 12a (here, the upper case 12) of the filter case 10. The plate 23 is slightly smaller than the plate 24.

The plate 23 has a substantially cylindrical hole 23a at a position overlapping with the hollow portion of the inner tube 22. The hole 23a has a size substantially same as the inner diameter of the inner tube 22. The hole 23a communicates between a space (space S1) inside the filter case 10 and outside filter element 20 and a space (space S3) surrounded by the region A2 in the side surface 22a of the inner tube 22 and the partition plate 22c.

A hole 24a is formed in the plate 24 at a position overlapping with the hollow portion of the inner tube 22. The hole 24a communicates between a space (space S2), which is surrounded by the first region A1 in the side surface 22a of the inner tube 22 and the partition plate 22c, and the outflow pipe 17. The hole 24a has a lower end portion substantially the same as the inner diameter of the inner tube 22. Also, the hole 24a includes a substantially frusto-conical shaped portion having an inner diameter on an upper side smaller than an inner diameter on a lower side.

The plate 24 includes a plate-like portion 24b and a protrusion portion 24c protruding upward from the plate-like portion 24b. The plate-like portion 24b has a diameter larger than a diameter of the filtration member 21, and the protrusion portion 24c has a diameter smaller than the diameter of the plate-like portion 24b. Note that the diameter of the plate-like portion 24b is preferably slightly larger than the diameter of the filtration member 21, and, for example, a difference between the diameter of the plate-like portion 24b and the diameter of the filtration member 21 is preferably substantially the same as a thickness of the ring 41.

Attachment of the plate 24 to the upper end surface 12a will be described. The upper end surface 12a includes two flat surfaces 121, 123, and a tubular portion 122 having a substantially cylindrical shape that couples the flat surface 121 and the flat surface 123. The flat surface 121 has a diameter smaller than a diameter of the flat surface 123.

The protrusion portion 24c is inserted into the tubular portion 122, the upper end surface of the protrusion portion 24c abuts on the flat surface 121, and the upper end surface of the plate-like portion 24b abuts on the flat surface 123. A sealing member (for example, an O-ring) 54 is provided on an outer peripheral surface of the protrusion portion 24c. The sealing member 54 is provided between the protrusion portion 24c and the tubular portion 122, and thus the plate 24, namely, the filter element 20, is mounted to the upper case 12.

A diameter of an outer peripheral surface of the plate-like portion 24b and a diameter of an inner circumferential surface of the side surface 12d (that is, the side surface of the filter case 10) are substantially the same. Thus, a gap between filtration member 21 and the filter case 10 becomes small. Thus, a volume (quantity of water) of the urea water stored in the filter case 10 can be reduced, and a volume change during freezing can be reduced.

In the state where the filter element 20 is mounted to the upper case 12, a gap exists between the plate 23 and the bottom surface 11a. The urea water that has flowed into the filter case 10 via, for example, the inflow pipe 16 first flows between the bottom surface 11a and the plate 23 and then flows between the filtration member 21 and the side surfaces 11d, 12d.

Considering the flow of the urea water, the inflow hole 11e, the inflow portion 11f, and the inflow pipe 16 are preferably provided near the bottom surface 11a. Additionally, the inflow hole 11e, the inflow portion 11f, and the inflow pipe 16 may be provided in the bottom surface 11a, not the side surface 11d.

The heater 30 is, for example, an electric heater or a ceramic heater. The heater 30 includes a mounting portion 32 having an outer peripheral surface on which an external thread portion 32a is formed. By screwing the external thread portion 32a with an internal screw portion 11g, which is formed on an inner peripheral surface of the heater mounting hole 11b and the tubular portion 11c, the heater 30 is provided on the bottom surface 11a of the filter case 10.

A sealing member (for example, an O-ring) 55 is provided on an outer peripheral surface of the mounting portion 32, and the sealing member 55 avoids the urea water to leak from between the mounting portion 32 and the tubular portion 11c.

The heater 30 includes a substantially rod-shaped heating unit 31. The heating unit 31 is provided on the mounting portion 32. The heating unit 31 is provided inside the filter case 10 such that the longitudinal direction extends along the vertical direction. Furthermore, the heating unit 31 is inserted into the space (the space S3) surrounded by the side surface 22a and the partition plate 22c of the inner tube 22 via the hole 23a.

The ring 41 is a member having a substantially cylindrical shape, and is provided between the filter element 20 and the filter case 10. The ring 41 is formed to float on the urea water. The ring 41 is not fixed and is movable between the plate 23 and the plate 24.

Next, a function of the filter device 1 thus configured will be described with reference to FIG. 1. The open arrow in FIG. 1 indicates a flow of the urea water.

The urea water flows into the space S1 via the inflow hole 11e, the inflow portion 11f, and the inflow pipe 16.

Prior to the urea water flowing into the space S1 inside the filter case 10, the ring 41 abuts on the plate 23 (see the dotted line in FIG. 1). Since the ring 41 floats on the urea water, when the urea water flows into the space S1 inside the filter case 10, the urea water pushes up the ring 41 (see the arrow in FIG. 1), and the ring 41 abuts on the plate 24 (see the solid line in FIG. 1) in a state where the urea water is fully stored in the space S1 inside the filter case 10.

The urea water that has flowed into the space S1 flows from the outside of the filtration member 21 to the inside of the filtration member 21, and accordingly the urea water is filtered. Since the hole 22b is not formed in the second region A2 of the inner tube 22, the urea water flows upward (in the +z-direction) along the inner tube 22, and flows out to the space S2 through the hole 22b formed in the first region A1 of the inner tube 22.

Note that the hole 22b is not formed in the second region A2 of the inner tube 22. Therefore, when the urea water flows into the space S1, the urea water flows into the region (the space S3) surrounded by the second region A2 and the partition plate 22c of the inner tube 22 from the lower side (−z-side), but air partially remains in a portion near the upper end of the space S3.

The urea water stored in the space S3 is warmed by the heater 30, thus preventing freezing of the urea water. However, there is a possibility that the urea water freezes due to, for example, a decrease in air temperature even when the urea water is warmed by the heater 30.

When the urea water freezes, the volume of the urea water increases by about 7%. Since the air partially remains in the upper end portion of the space S3, the urea water compresses a gas in the space 3 in a process in which the urea water freezes. Thus providing the space for expansion of the urea water inside the filter device 1 prevents damage to, for example, the filter case 10 and the filter element 20.

Note that in the present embodiment, an opening of the space S3 is near the bottom surface 11a and faces downward (the −z side). Therefore, even when the filter device 1 is inclined, a possibility that the gas enclosed in the space S3 exits to the outside from the space S3 is extremely low.

When, for example, the construction machine or the automobile in which the filter device 1 is mounted in the urea SCR system is stopped, the urea water is returned to the tank to prevent the freezing of the urea water (see FIG. 5). Therefore, each time, for example, the construction machine or the automobile is stopped, the inside of the filter device 1 is filled with a gas (air).

Subsequently, when, for example, the construction machine or the automobile is started, the air inside the filter device 1 is sucked out by a pump, and then the urea water is supplied from the tank to the filter device 1.

In the urea SCR system, an injector is provided downstream of the filter device 1. The injector needs to raise a pressure to a high pressure (for example, 900 kPa) immediately (for example, within 90 seconds) after the start of the construction machine. However, when an amount of air supplied to the injector is large, a defect such as the pressure that does not rise to a predetermined pressure occurs.

In the present embodiment, since the volume of the space S1 is small, it is possible to reduce the air supplied to the injector at the time of the start of the construction machine. Therefore, it is possible to prevent a defect due to air, specifically, a defect, such as the pressure of the injector that does not rise to a predetermined pressure at the time of the start of the construction machine.

Next, a case where the filter device 1 is inclined will be described. In the present embodiment, the filter device 1 is applied to the urea SCR system that reduces NOx contained in the exhaust air of the internal combustion engine, and the urea SCR system is mounted on a vehicle, such as a construction machine. Accordingly, the filter device 1 is possibly inclined together with the vehicle.

Figure 4:
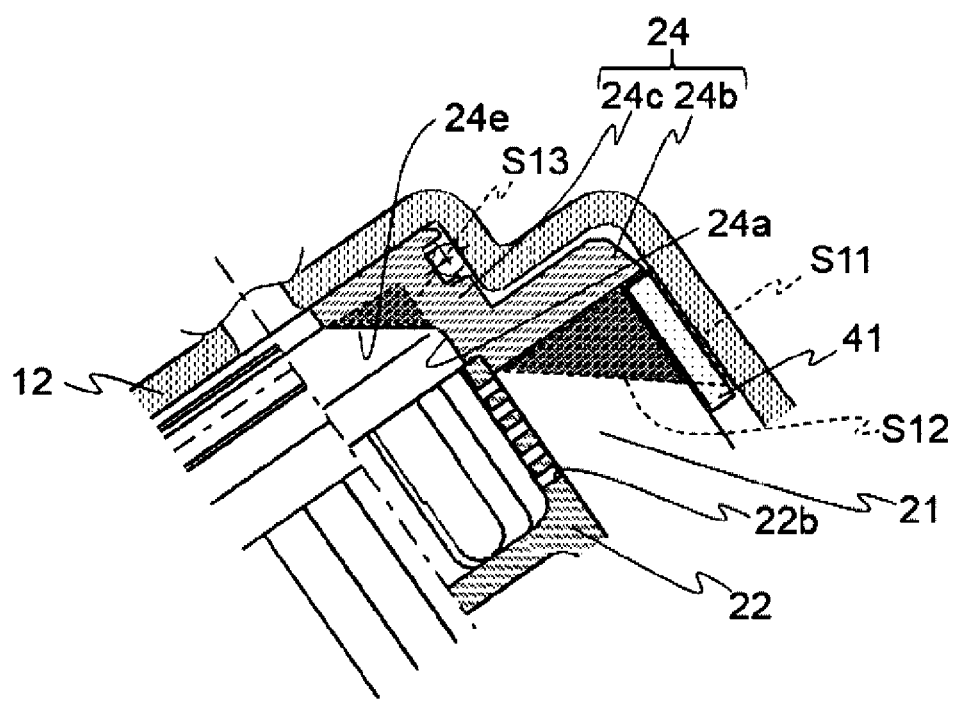
FIG. 4 is a view schematically illustrating a state in which the filter device 1 is inclined.

FIG. 4 is a view schematically illustrating the state in which the filter device 1 is inclined. When the ring 41 is not provided, a space S11 (see the hatching in FIG. 4) to be an air pocket is formed at a corner of the filter element 20. Providing the ring 41 allows reducing the air pocket to a space S12 (see the hatching in FIG. 4). In particular, since the difference between the diameter of the plate-like portion 24b and the diameter of the filtration member 21 are substantially the same as the thickness of the ring 41, the space S12 becomes only a region overlapping with the filtration member 21, and the space S12 becomes small.

The hole 24a includes a substantially frusto-conical shaped tapered portion 24e with an inner diameter on the upper side smaller than an inner diameter on the lower side. When the hole 24a does not include the tapered portion 24e, a space S13 (see the hatching in FIG. 4) to be an air pocket is formed inside the hole 24a, but when the hole 24a includes the tapered portion 24e, the space S13 can be eliminated.

According to the present embodiment, providing the heater 30 (the heating unit 31) inside the filter case 10 allows preventing the urea water from freezing. In addition, the gas enclosed in the space S3 is compressed during freezing. Therefore, even when the urea water freezes, breakage of the filter device 1 can be prevented.

In addition, according to the present embodiment, by inserting the heating unit 31 into the space S3, the filter device 1 can be downsized and the volume of the space S1 can be reduced. Further, by bringing the filter element 20 and the side surfaces (the side surface 11d and the side surface 12d) of the filter case 10 close, the volume of the space S1 can be reduced. Thus reducing the volume of the space S1 allows reducing the volume (the quantity of water) of the urea water stored in the filter case and reducing the volume change during freezing. Moreover, reducing the volume of the space S1 allows reducing the air supplied to the injector at the time of the start of the construction machine, thus ensuring preventing a defect caused by air.

In addition, according to the present embodiment, since the ring 41 is provided, it is possible to reduce a space in which a gas accumulates inside the space S1 when the filter device 1 is inclined. In addition, since the hole 24a includes the tapered portion 24e, it is possible to reduce the space in which a gas accumulates inside the hole 24a when the filter device 1 is inclined. Therefore, it is possible to reduce an amount of air that accumulates inside the filter device 1, and to prevent a defect due to air that is supplied to the pump or the injector when the inclination of the filter device is eliminated.

The embodiments of the invention are described above in detail with reference to the drawings. However, specific configurations are not limited to the embodiments and also include changes in design or the like without departing from the gist of the invention. For example, in the examples described above, detailed description is made to facilitate understanding of the present invention, and the examples are not necessarily limited to examples including all the configurations described above. In addition, the configuration of an embodiment can be replaced partially with the configurations of other embodiments. In addition, addition, deletion, replacement or the like of other configurations can be made on the configurations of the embodiments.

Additionally, in the present disclosure, "substantially" is a concept not only including the case of being strictly the same, but also including an error and deformation to the extent that a loss of identity does not occur. For example, the term "substantially orthogonal" is not limited to the case of being strictly orthogonal, but includes a concept that includes deviations of several degrees, for example. Further, simple expressions such as orthogonal, parallel, equal, and identical are not to be understood as merely being strictly, for example, orthogonal, parallel, equal, and identical, and include being, for example, substantially parallel, substantially orthogonal, substanially equal, and substantially identical.

Additionally, in the present disclosure, "vicinity" means to include a region in a certain range (the range can be determined arbitrarily) near a reference position. For example, the term "a vicinity of an end" refers to a range of regions vicinity the end, and is a concept indicating that the end may or needs not be included.

REFERENCE SIGNS LIST

1: Filter device
10: Filter case
11: Lower case
11a: Bottom surface
11b: Heater mounting hole
11c: Tubular portion
11d: Side surface
11e: Inflow hole
11f: Inflow portion
11g: Internal screw portion
12: Upper case
12a: Upper end surface
12b: Outflow hole
12c: Outflow portion
12d: Side surface
16: Inflow pipe
17: Outflow pipe
20: Filter element
21: Filtration member
22: Inner tube
22a: Side surface
22b: Hole
22c: Partition plate
23, 24: Plate
23a, 24a: Hole
24b: Plate-like portion
24c: Protrusion portion
24e: Tapered portion
30: Heater
31: Heating unit
32: Mounting portion
32a: External thread portion
41: Ring
51, 52, 53, 54, 55: Sealing member
100: Urea SCR system
101: Filter device
102: Tank
103: Pump
104: Injector
121, 123: Flat surface
122: Tubular portion

The invention claimed is:

1. A filter device as a filtration device for filtering a freezable liquid, the filter device comprising:
a filter case that includes an inflow portion and an outflow portion for the liquid;
a filter element having a cylindrical shape provided inside the filter case with a center axis extending in a vertical direction, the filter element including a filtration member, an inner tube, a first plate, and a second plate, the filtration member having a cylindrical shape that filters the liquid, the inner tube having a cylindrical shape provided inside the filtration member, the first plate covering a lower end of the filtration member, the second plate covering an upper end of the filtration member; and
a heater provided on a bottom surface of the filter case, wherein
the inner tube includes a partition plate that partitions a hollow portion formed inside the inner tube,
an inner tube side surface, as a side surface of the inner tube, has a first region and a second region, the first region is located vertically upward of the partition plate, and the second region is located vertically downward of the first region,
in the first region, a plurality of holes penetrating the inner tube side surface are formed,
the first plate has a first hole, the first hole communicating with the hollow portion of the inner tube, and
the heater includes a rod-shaped heating unit, and the heating unit is inserted into a space surrounded by the second region in the inner tube side surface and the partition plate via the first hole.

2. The filter device according to claim 1, wherein
the second plate has a second hole having a cylindrical shape, the second hole communicating with the hollow portion of the inner tube,
the outflow portion communicates with the second hole, and
the second hole includes a frusto-conical shaped portion having an inner diameter on an upper side smaller than an inner diameter on a lower side.

3. The filter device according to claim 1, comprising
a ring having a cylindrical shape disposed between the filter element and the filter case, wherein
the ring is movable between the first plate and the second plate.

4. The filter device according to claim 3, wherein
the second plate is larger than the filtration member,
the filter case has a side surface having a cylindrical shape, a diameter of an inner peripheral surface of the side surface is equal to a diameter of an outer peripheral surface of the second plate, and
a difference between a diameter of the second plate and a diameter of the filtration member is equal to a thickness of the ring.

5. The filter device according to claim 2, comprising
a ring having a cylindrical shape disposed between the filter element and the filter case, wherein
the ring is movable between the first plate and the second plate.

6. The filter device according to claim 5, wherein
the second plate is larger than the filtration member,
the filter case has a side surface having a cylindrical shape, a diameter of an inner peripheral surface of the side surface is equal to a diameter of an outer peripheral surface of the second plate, and
a difference between a diameter of the second plate and a diameter of the filtration member is equal to a thickness of the ring.

* * * * *